United States Patent
Rogers (10) Patent No.: US 6,609,682 B2
(45) Date of Patent: Aug. 26, 2003

(54) AIRPLANE LANDING GEAR SUSPENSION AND SHOCK-ABSORBING DEVICE

(76) Inventor: Burl A. Rogers, P.O. Box 671487, Chugiak, AK (US) 99567

(*) Notice: Subject to any disclaimer, the term of this patent is extended or adjusted under 35 U.S.C. 154(b) by 0 days.

(21) Appl. No.: 09/910,286

(22) Filed: Jul. 19, 2001

(65) Prior Publication Data

US 2003/0015622 A1 Jan. 23, 2003

(51) Int. Cl.[7] .......................... B64C 25/04; F16F 7/10
(52) U.S. Cl. ........................... 244/100 R; 188/129
(58) Field of Search ............................. 188/67, 322.22, 188/129, 381, 281, 271, 300; 244/100 R, 102 A, 102 SS, 102 SL; 248/358, 633, 653, 562, 636; 301/6.2, 6.91; 267/1, 221, 140.5, 140.1, 120; 91/405

(56) References Cited

U.S. PATENT DOCUMENTS

| | | | | |
|---|---|---|---|---|
| 1,779,690 A | * | 10/1930 | Bell .......................... 180/9.5 |
| 2,484,919 A | * | 10/1949 | Westcott, Jr. .......... 244/102 SS |
| 3,042,345 A | * | 7/1962 | Holland, Jr. ............. 244/100 R |
| 3,990,542 A | * | 11/1976 | Dent et al. ...................... 16/82 |
| 4,172,570 A | * | 10/1979 | Leoni .................... 244/104 CS |
| 5,230,407 A | * | 7/1993 | Smith et al. ................. 188/281 |
| 5,257,680 A | * | 11/1993 | Corcoran et al. ........... 188/129 |
| 5,325,943 A | * | 7/1994 | Ralph ......................... 188/288 |
| 5,501,434 A | * | 3/1996 | McGuire ................ 267/140.11 |
| 5,613,580 A | * | 3/1997 | Young ......................... 188/300 |
| 5,720,369 A | * | 2/1998 | Thorn ......................... 188/300 |
| 5,927,646 A | * | 7/1999 | Sandy et al. ................. 188/377 |
| 6,155,541 A | * | 12/2000 | Farris et al. ............. 267/64.15 |
| 6,290,038 B1 | * | 9/2001 | Jensen et al. ............... 188/381 |

* cited by examiner

Primary Examiner—Charles T. Jordan
Assistant Examiner—Stephen A Holzen
(74) Attorney, Agent, or Firm—Michael J. Tavella (57) ABSTRACT

A shock absorber that uses polyurethane discs for aircraft landing gear. The discs are maintained under compression. When the aircraft lands or taxis, loads further compress the discs. Unlike bungee cords, however, the discs do not release their energy immediately. Rather, they release the energy slowly, which produces a smoother reaction to loads that eliminates any bounce back of the aircraft.

19 Claims, 14 Drawing Sheets

AIRPLANE LANDING GEAR SUSPENSION AND SHOCK-ABSORBING DEVICE

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to suspension systems for small aircraft landing gear and particularly to suspension systems for small aircraft landing gear that use polyurethane cylinders or disks as shock absorbing and suspension elements.

2. Description of the Prior Art

Figure 1:
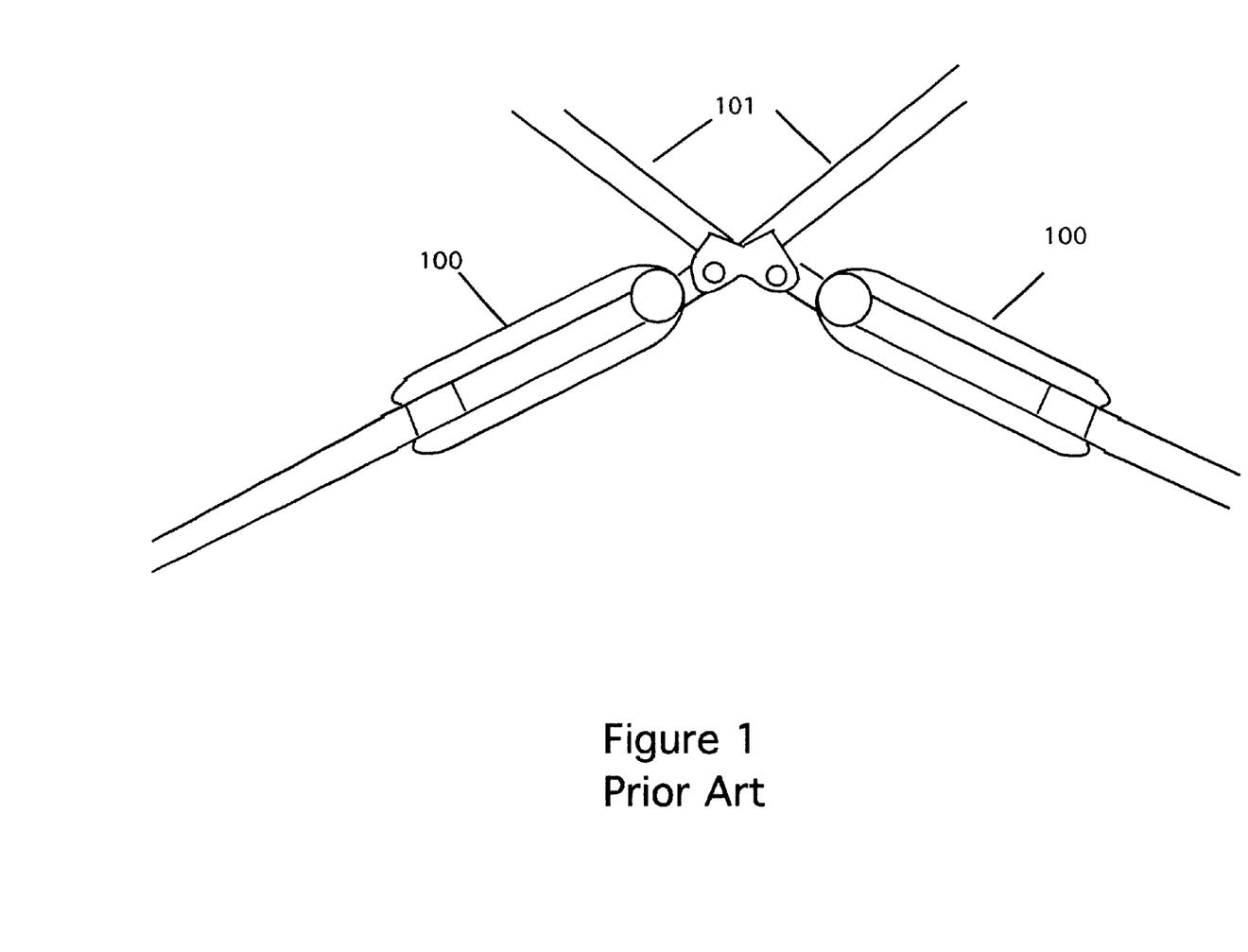
FIG. 1 is a front view of a landing gear strut system as prior art.

Small aircraft that have fixed landing gear must have some type of suspension system to handle the impacts of taxiing and landing. When a small plane lands and its wheels touch the ground, there must be some means for allowing the landing gear struts to deflect and then return to a normal loaded position. One system in use today uses a strut that has an automotive shock absorber type structure as part of the strut. This type of suspension is shown in FIG. 1, labeled as "prior art". The shock absorber 100 uses a pair of elastic "bungee" cords on "shock rings". These cords stretch under load, such as landing, allowing the landing gear to spread under the load. The problem with these bungee cords is that when the aircraft has landed and the load recovers, the bungee cords then pull back and contract. This can have the effect of a slingshot that can actually propel the airplane back into the air. This can cause control difficulties and possibly even a crash.

BRIEF DESCRIPTION OF THE INVENTION

The instant invention solves this problem. It is a shock absorber that uses polyurethane cylinders, discs or a combination of disks and cylinders. The cylinder is maintained under compression. When the aircraft lands or taxis, loads further compress the discs. Unlike bungee cords, however, the discs do not release their energy immediately. Rather, they release the energy slowly, which produces a smoother reaction to loads that eliminates any bounce back of the aircraft.

DETAILED DESCRIPTION OF THE INVENTION

Figure 3:
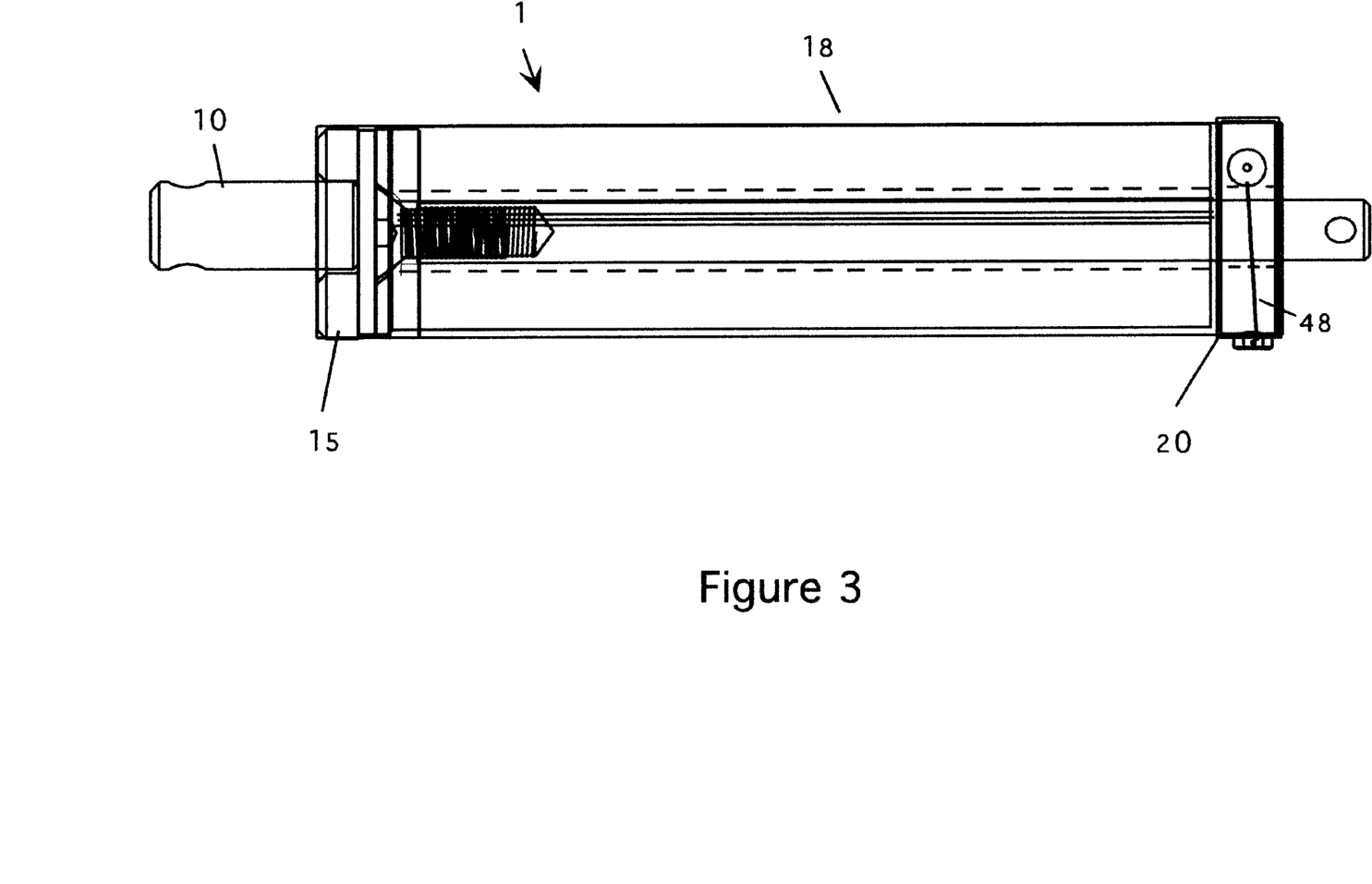
FIG. 3 is a side view of the assembled invention in cut-away form.
Figure 3A:
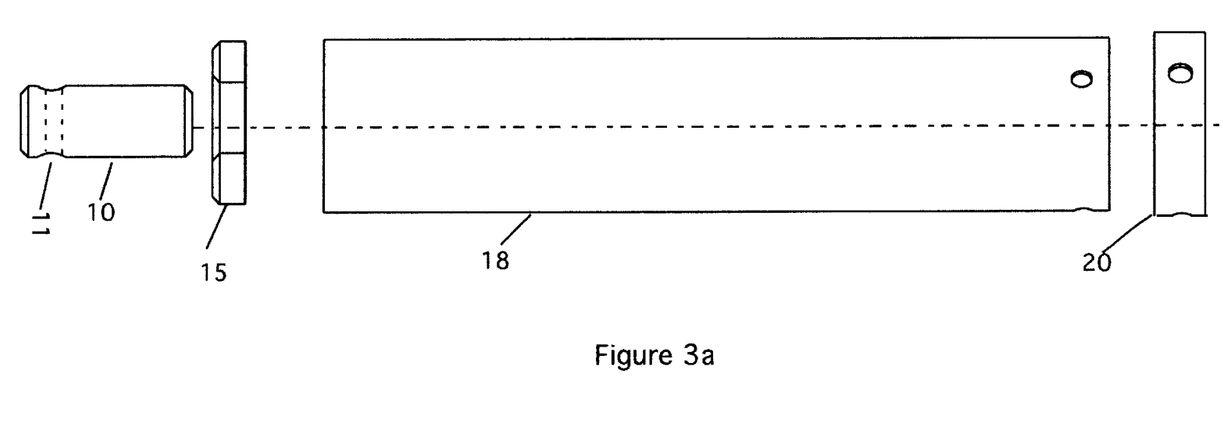
FIG. 3a is a view of the outer body of the invention.
Figure 3B:
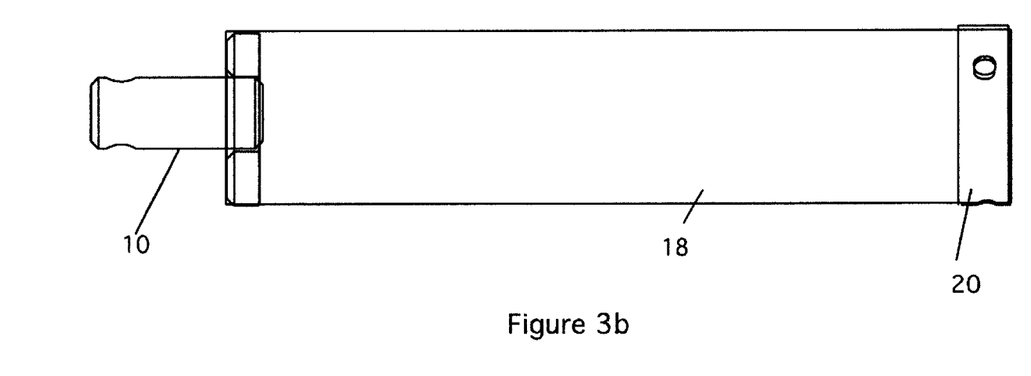
FIG. 3b is a detail side view of the assembled outer body.

Referring now to FIGS. 3, 3a 3b and 3c, the assembled suspension assembly 1 is shown in FIG. 3. FIG. 3a is an exploded view of the outer housing components. FIG. 3b is a detail view showing these components assembled.

Figure 2:
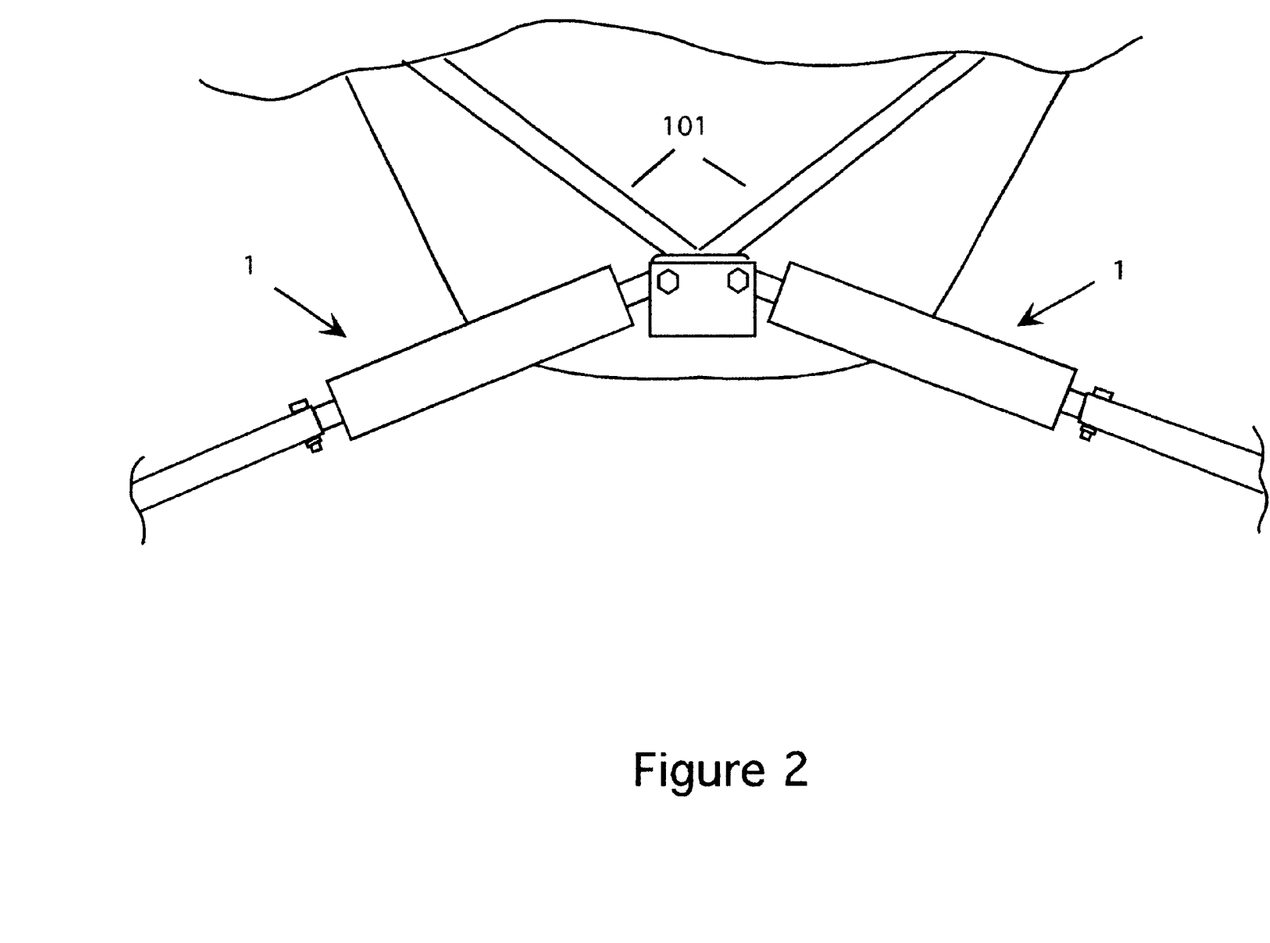
FIG. 2 is a front view of a landing gear strut system showing the instant invention.
Figure 3C:
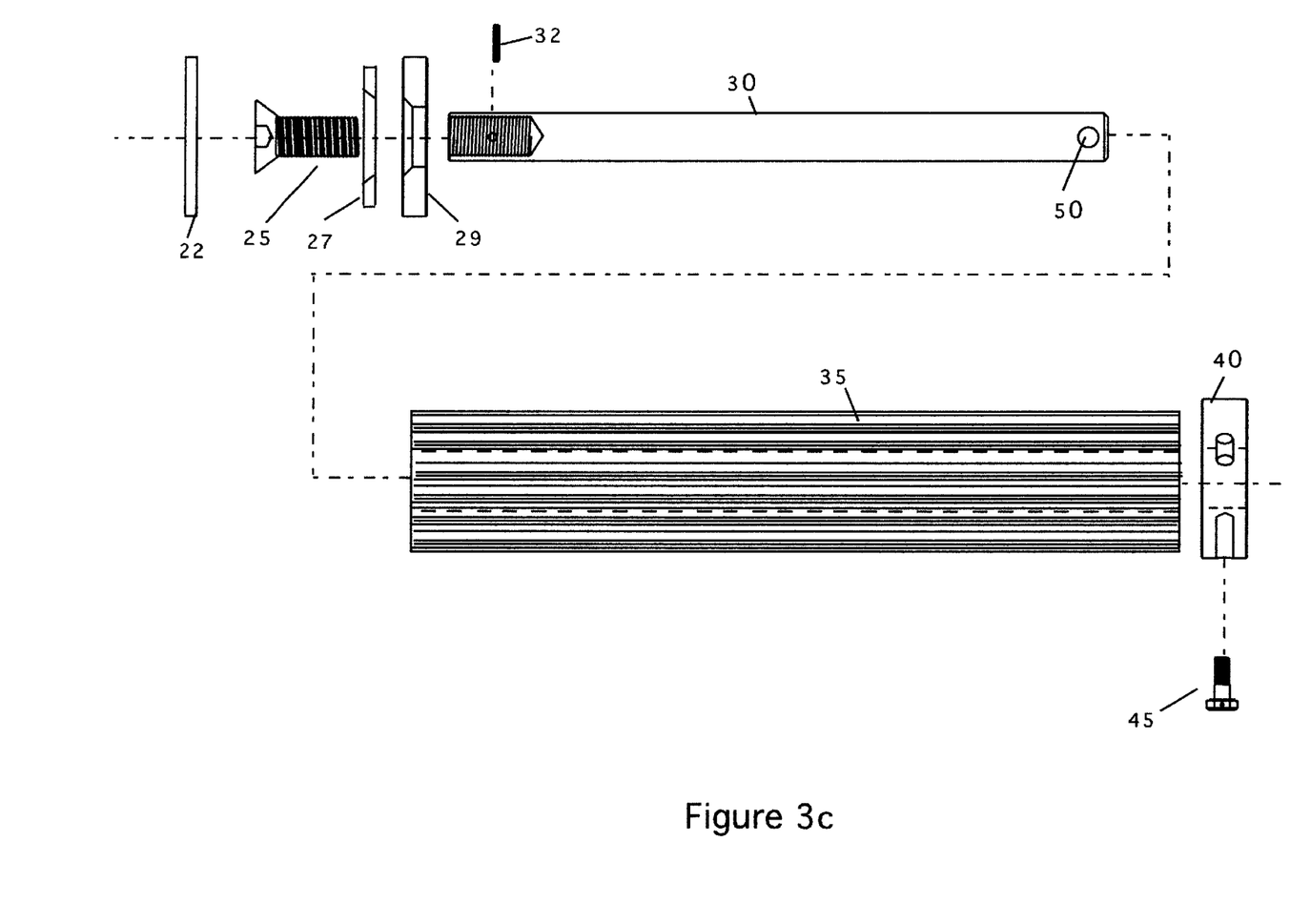
FIG. 3c is an exploded view of the inner components of the invention.

FIG. 3c is an exploded view of the inner assembly. FIGS. 4a–15 are detail views of the various components shown in this view. As shown in FIG. 2, the device is suspended between the V-cabane struts 101, using attachment points on both ends of the assembly 1, as discussed below.

At the first end of the assembly 1, is an attachment fitting 10. This fitting is used to attach one end of the assembly to the airplane V-cabane strut 101, as discussed above. The attachment fitting 10 has a mounting hole 11 drilled perpendicular to its longitudinal axis. This hole 11 is used to bolt one end of the assembled device to one of the v-cabanes. One end of the attachment fitting 10 is welded to a weld base 15. As shown in FIG. 3b, one end the attachment fitting 10 passes through the weld base until it is flush with the inner edge of the weld base. The fitting is first press fit and then welded to the weld base. The weld base 15 is secured inside an outer body tube 18 by welding it into the outer body tube 18. See FIGS. 6a and 6b. The outer body tube 18 is hollow and is open at both ends. After the weld base 15 is welded on one end of the outer body tube 18, the combination forms an outer housing, having a closed end and an open end. As shown in FIGS. 3a and 3b, the weld base is welded inside of the tube. At the other end of the tube, A tube body reinforcement piece 20 (shown in FIGS. 7a and 7b) is attached to the other end of the tube body 18. The reinforcement piece 20 is placed over the outside of the tube. Note that the holes are typically drilled through both the reinforcement ring and the tube body at the same time, to ensure proper alignment. This assembly, shown in FIG. 3b forms the outer housing for the device.

The inner shock assembly, shown in exploded form in FIG. 3c, is installed inside the outer housing. First, a reaction bumper 22 (FIGS. 4c and 4d) is installed in the outer housing. This bumper sits against the weld base to prevent metal-to-metal contact. The reaction bumper 22 can be made of rubber, but in the preferred embodiment, it is made of a heavier grade polyurethane material as the POLYSORB element (discussed below).

Figure 15:
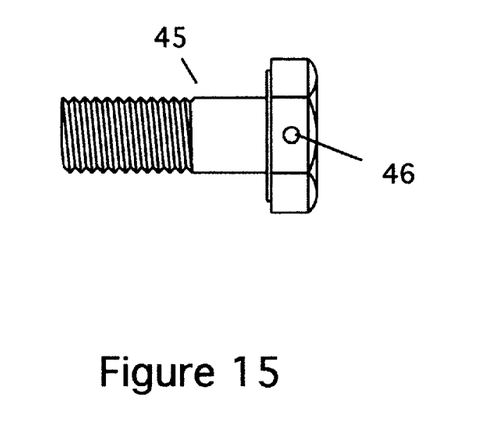
FIG. 15 is a side view of a lower-guide retaining bolt, shown in an enlarged size.

Next, the inner shock assembly is made up before inserting it into the outer housing. This assembly has a retaining bolt 25 that passes through a retainer washer 27 and a guide 29. A dynamic suspension rod 30 is threaded onto the bolt as shown. This rod is drilled and tapped on one end to accept the retaining bolt 25. A spring roll pin 32 is placed through the dynamic suspension rod 30 to secure the retainer bolt in place. This assembly acts as a piston within the outer housing. Next, a length polyurethane shock absorber and suspension element 35 is placed in the tube around the dynamic suspension rod 30. This polyurethane shock absorber can be a cylinder as shown, or a series of disks that when stacked, form a cylinder. This assembly is then placed into the outer housing. Finally, a lower guide 40 is placed in the end of the device and aligned with the holes in the body tube reinforcing ring. The lower guide is held in place with three bolts 45 that pass through the outer reinforcing ring and the body tube and then screw into tapped holes within the lower guide. A length of stainless steel safety wire 48 is then run between the bolts 45. The wire passes through holes 46 that are drilled in the tops of the bolts 45 as shown in FIG. 15.

As shown in FIG. 3, the dynamic suspension rod 30 passes through a hole in the center of the lower guide. The dynamic suspension rod 30 has a hole 50 in the protruding end that is used to secure the other end of the assembly to the airplane landing strut system.

Referring now to FIGS. 4a–15, details of these components are provided.

Figure 4A:
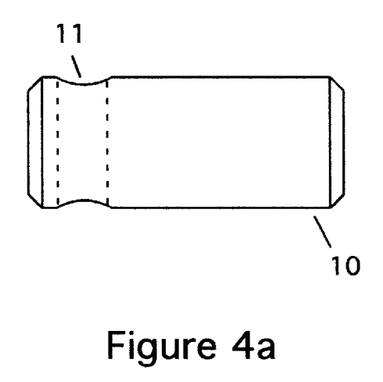
FIG. 4a is a side view of an attachment fitting.
Figure 4B:
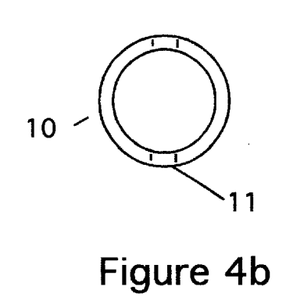
FIG. 4b is an end view of the attachment fitting.
Figure 4C:
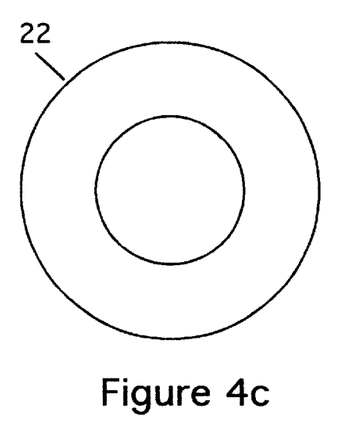
FIG. 4c is a front view of a reaction bumper.
Figure 4D:
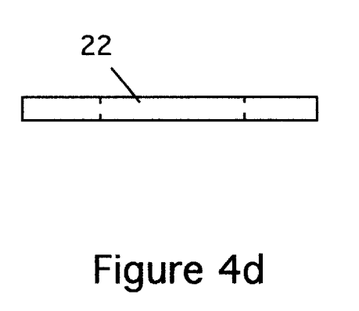
FIG. 4d is a side view of the reaction bumper.

FIG. 4a is a side view of the attachment fitting 10. FIG. 4b is an end view of the attachment fitting 10. The attachment fitting 10 is designed to connect the assembly 1 to the airplane "V" cabane strut. As shown in the figures, it has a hole 11 drilled through one end. The hole 11 is used to make the connection to the strut, as described below. The body of the fitting 10 is such that it extends out from the body at a sufficient distance to allow for an easy connection, but not so far as to weaken the assembly.

Figure 5A:
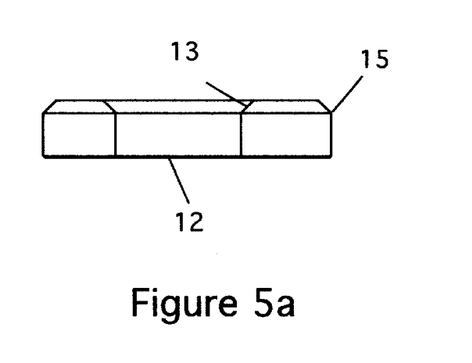
FIG. 5a is a side view of a weld base.
Figure 5B:
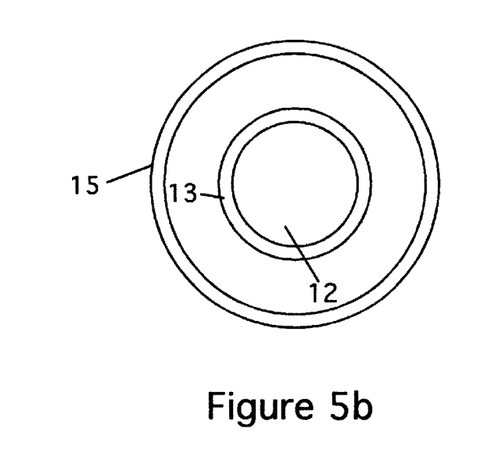
FIG. 5b is a top view of the weld base.
Figure 5C:
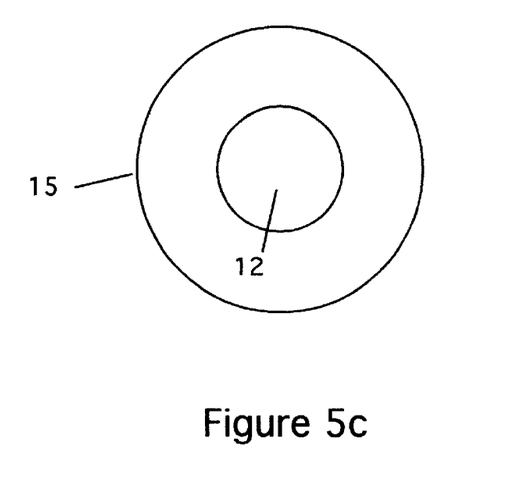
FIG. 5c is a bottom view of the weld base.

The attachment fitting 10 is pressed into the weld base 15, which is shown in FIGS. 5a, 5b and 5c. As shown in FIG. 5, the weld base 15 is also center drilled to receive the retaining bolt 25. One end of the weld base 15 is chamfered as shown. On the same end, the through hole 12 is also counter bored at 13 to accept attachment fitting. FIG. 5b is a top view of the weld base. FIG. 5c is a bottom view of the weld base.

Figure 6A:
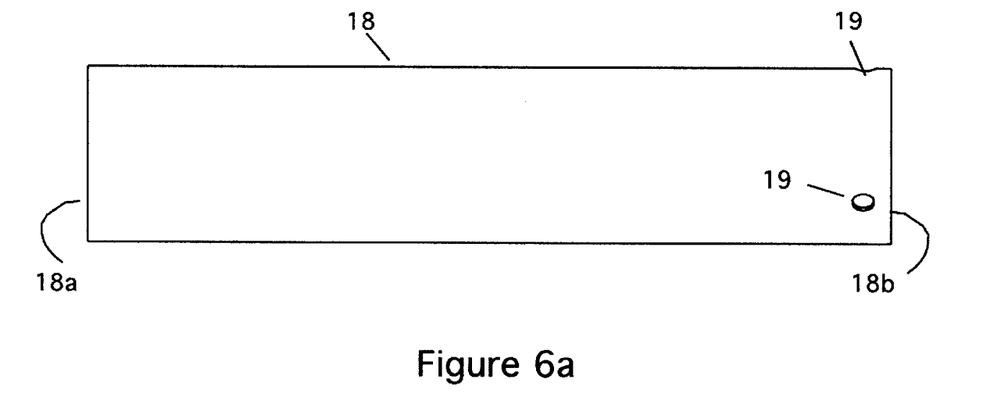
FIG. 6a is a side view of a suspension tube body.
Figure 6B:
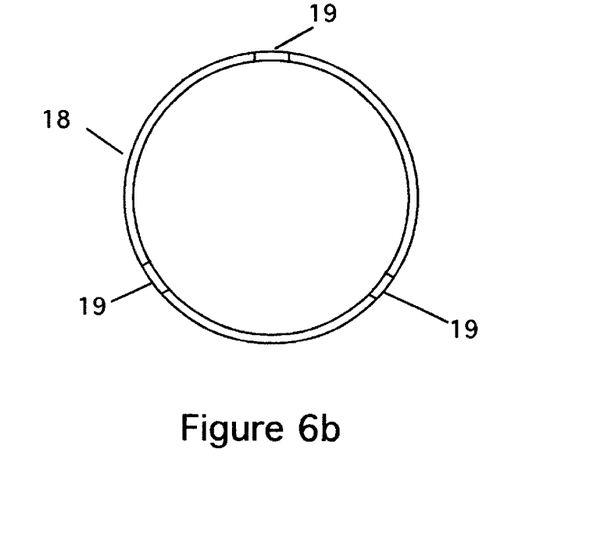
FIG. 6b is a right end view of the suspension tube body.

FIG. 6a is a side view of the suspension tube body 18. FIG. 6b is a right end view of the suspension tube body. As shown in the figures, this body 18 is a cylindrical tube that has three holes 19 drilled into one end 18b. At the other end 18a of the tube body, the weld base is installed with the attachment fitting. The weld base is welded into this end of the tube. The weld base reinforces this end of the tube as well as forming the attachment connection for the assembly.

Figure 7A:
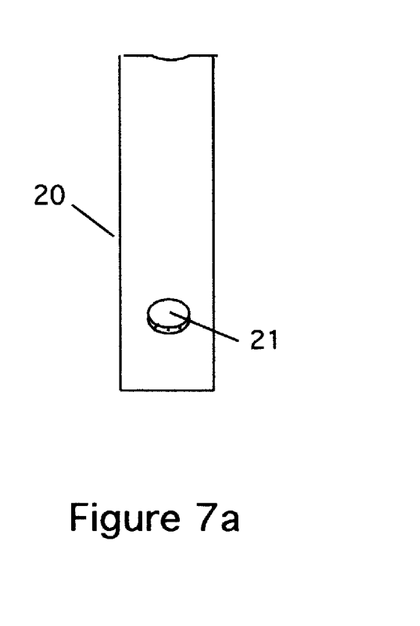
FIG. 7a is a side view of a reinforcing ring.
Figure 7B:
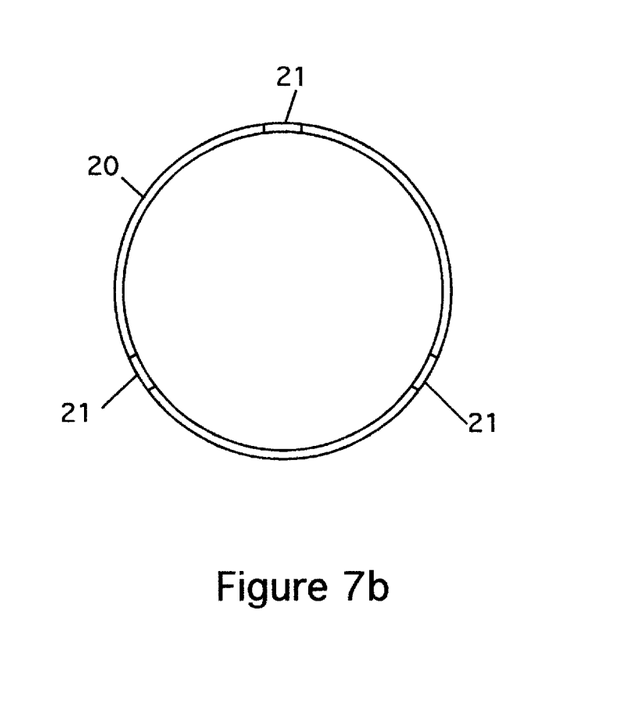
FIG. 7b is a cross-section view of the reinforcing ring.

The holes 19 are used to secure the body retainer and lower guide. The reinforcing ring 20 is used to strengthen the end of the thin wall tube body opposite to the end that is strengthened by the weld base 15. As shown in the figures, the reinforcing piece 20 has three holes 21 that correspond to the holes 19 in the body tube. In the preferred embodiment, the reinforcing ring has a slightly larger diameter than the body tube. That allows the ring to be placed on the outside of the body tube (see FIG. 3a). The reinforcing piece 20 is welded to the outside of the body tube, which secures it permanently in place. At the attachment fitting end (also the upper end), a bumper is placed within the tube body to eliminate the metal to metal contact between the weld body and the components attached to the dynamic suspension rod 30. In the preferred embodiment, this bumper is made of a similar material to the shock and suspension element.

Figure 8:
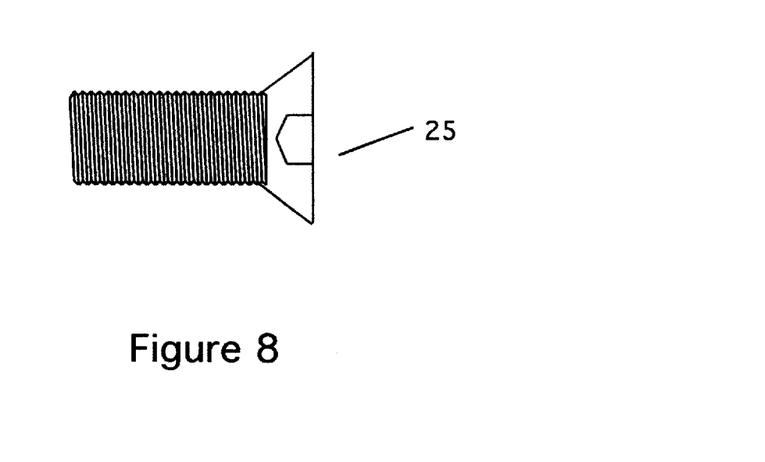
FIG. 8 is a side view of a retainer bolt.

Referring now to FIG. 8 a side view of a retainer bolt 25 is shown. This bolt is placed into the dynamic suspension rod 30. This is discussed in detail below.

Figure 9A:
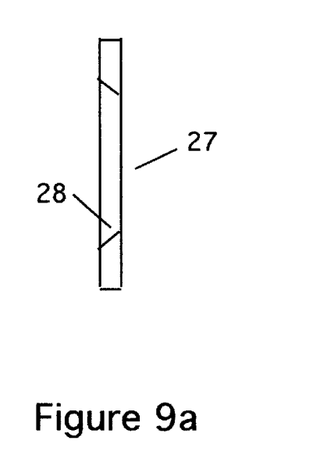
FIG. 9a is a side view of an upper retainer washer.
Figure 9B:
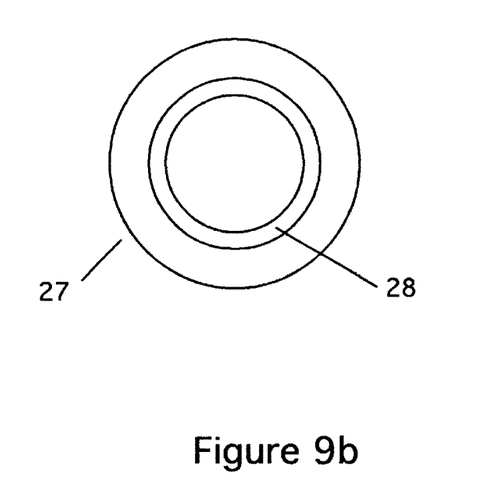
FIG. 9b is a front view of the upper retainer washer.
Figure 10A:
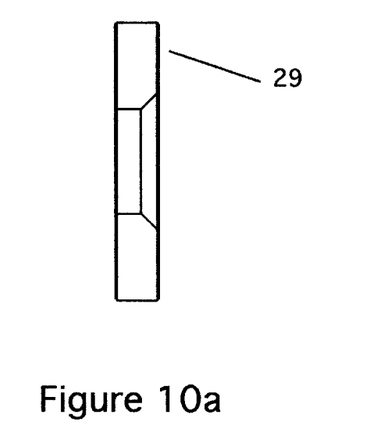
FIG. 10a is a side view of an upper guide.
Figure 10B:
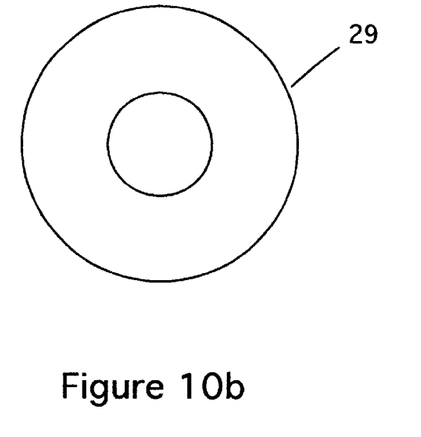
FIG. 10b is a bottom view of the upper guide.
Figure 10C:
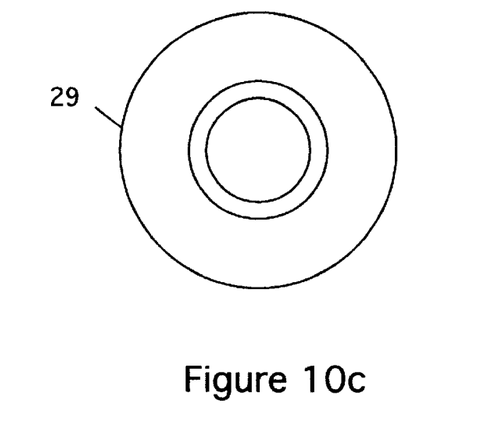
FIG. 10c is a top view of the upper guide.

After the retainer bolt is placed in the dynamic suspension rod 30, two other components are then added. FIGS. 9a and 9b show views of the upper retainer washer 27. This is placed over the dynamic suspension rod 30 until it rests against the retainer bolt. The second component is the upper guide 29, which is shown in FIGS. 10a, 10b and 10c. Note that both of these components have drilled centers and countersunk surfaces to accept the retainer bolt 25. As shown in FIG. 3b, these components are placed inside the body tube and are stacked against the bumper, as shown.

Figure 11A:
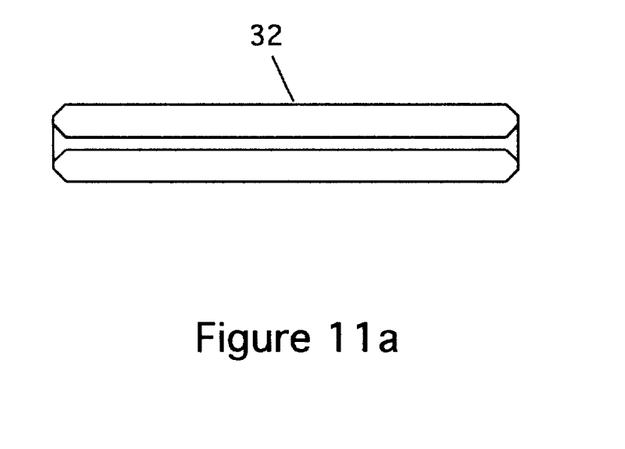
FIG. 11a is a side view of a spring roll pin shown in enlarged size.
Figure 11B:
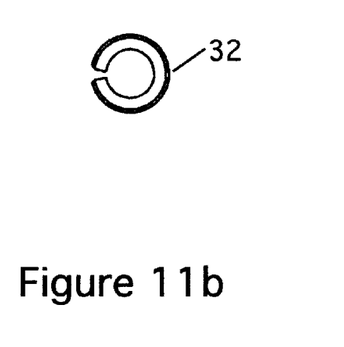
FIG. 11b is an end view of the spring roll pin shown in enlarged size.
Figure 12:
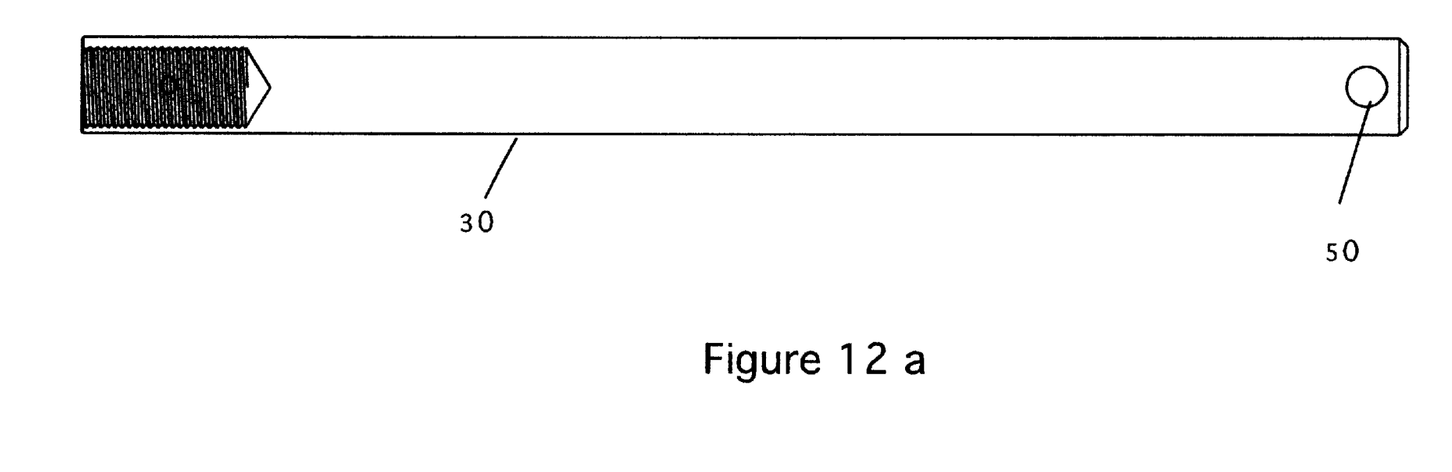
FIG. 12a is a side view of a dynamic suspension rod.
FIG. 12b is a left end view of the dynamic suspension rod.
Figure 13:
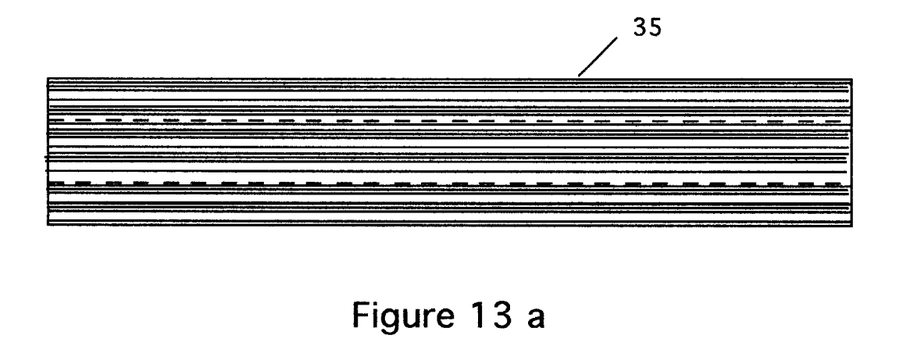
FIG. 13a is a side view of a POLYSORB reaction damper.
FIG. 13b is an end view of the POLYSORB reaction damper.

Turning now to FIGS. 12a and 12b, the dynamic suspension rod 30 is shown. The dynamic suspension rod 30 is designed to be longer that the length of the tube body so that one end 31 extends out past the end of the tube body (see FIG. 3a). The other end of the dynamic suspension rod 30 is drilled and tapped to receive the retainer bolt 25. Once in place, the retainer bolt holds the dynamic suspension rod 30 in position within the tube body. To secure the retainer bolt in place within the dynamic suspension rod 30, the spring roll pin 32 is placed through the dynamic suspension rod 30 as shown. This pin is shown in FIGS. 11a and 11b in enlarged size.

Figure 16:
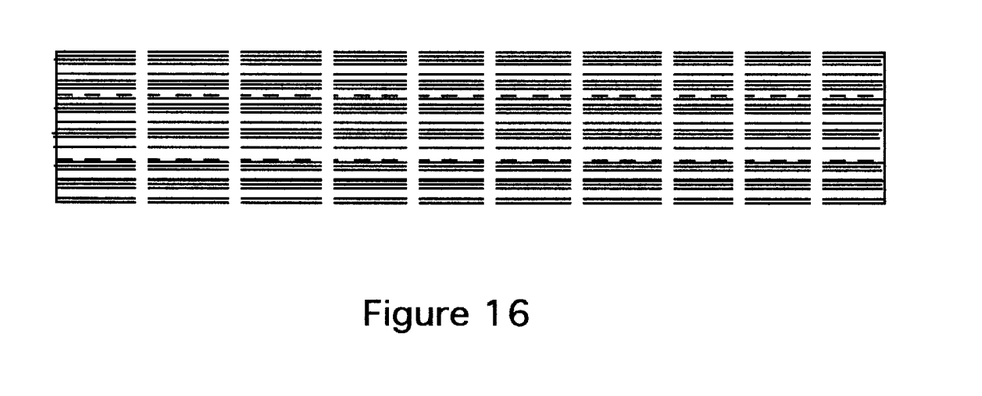
FIG. 16 is a side view of a POLYSORB reaction damper shown being formed of disks, combined into a cylinder.

The key to the assembly is a piece of POLYSORB reaction damper 35, which is shown in FIGS. 13a and 13b. The POLYSORB material is a polyurethane material that has the ability to compress under load and then return to its original form once the load is removed. Another important characteristic of this material is that it restores its original form over a relative long period. This allows the material to provide a shock dampening effect. The elastic used in the prior art bungee systems has the opposite effect; when it contracts, it releases its energy quickly, producing a "bounce back" effect. Thus, using the POLYSORB material eliminates the dangers caused by the old systems. This material can be purchased from polyurethane suppliers. One such supplier is Polyurethane Products Corporation, 100 Interstate Rd, Addison Ill. 60101. For purposes of this device, it can be purchased in disks or in cylinders. In the preferred embodiment, the cylinders are preferred because they make manufacture easier. In the preferred embodiment, the material is considered "medium hard" and has a 15 percent maximum deflection. In the preferred embodiment, a 4000-pound load produces a deflection in the material of approximately 2.5 inches. Another characteristic of this material is durability. It has the ability to contract and expand thousands of times with each expansion and contraction occurring in short periods. This ability to handle many rapid compression-expansion cycles without losing the resilience of the material is key to the operation of this suspension system. Although the solid cylinder is preferred, the "cylinder" may also be made up of a number of disk segments, shown in FIG. 16.

As shown in FIG. 13b, the end view of the POLYSORB reaction damper shows that it has a hollow core, through which the dynamic suspension rod 30 passes. The POLYSORB reaction damper 35 is placed inside of the body tube as shown in FIGS. 3a and 3b. Note that in the preferred embodiment, the POLYSORB reaction damper 35 is slightly longer that the space provided for it in the body tube. This is done to force the POLYSORB reaction damper 35 into compression in its normal at rest mode. This pre-compression is needed to supply the necessary preload on the POLYSORB element to allow the suspension to hold the static weight of the aircraft.

Figure 14A:
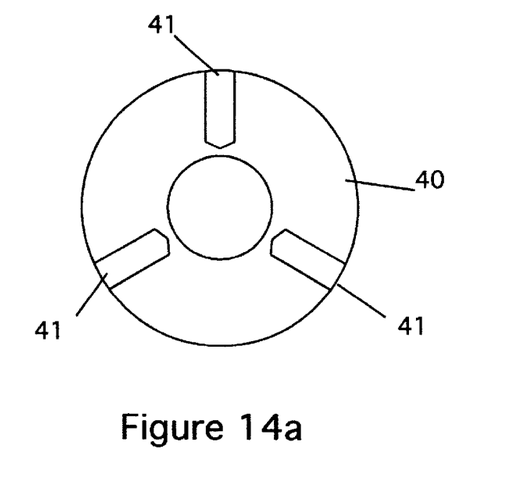
FIG. 14a is a front view of a lower guide.

Once the POLYSORB reaction damper 35 has been installed in the tube, the lower guide 40 is installed. FIG. 14a is a front view of a lower guide.

Figure 14B:
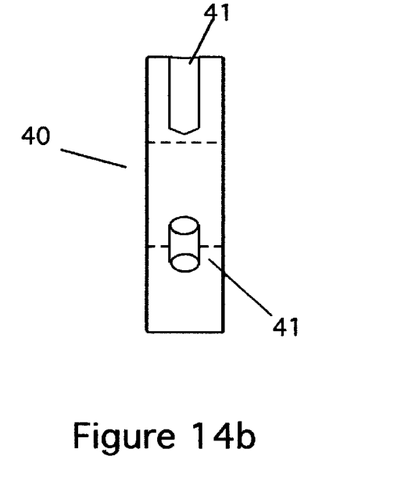
FIG. 14b is a side view of the lower guide.

FIG. 14b is a side view of the lower guide. As shown, the lower guide has three holes and has its center drilled. This fits over the dynamic suspension rod 30 and aligns with the holes 19 in the body tube. Once the lower guide is in place, the three bolts 45 pass through holes in the reinforcing ring 20, which is on the outside of the tube, holes 19 in the body tube, and then into the lower guide 40. The bolts 45 secure the lower guide into the housing. The bolts 45 are shown in FIG. 15. Each of the bolts has a small hole 46 through which a piece of stainless steel safety wire is passed. The wire is secured to all three bolts to prevent loss of the bolts.

That describes the entire assembly 1. As shown in FIG. 3a, the dynamic suspension rod 30 extends out of the end of the body tube. It has a hole 50 at end 31 that is used to secure that end of the assembly to the aircraft landing gear struts. To attach the assembly to the landing gear, the following procedure is used.

Referring now to FIG. 1 for details of these first steps, raise the complete aircraft or either main landing gear, one at a time, and support it approximately 2" off the floor or ground. Remove any covers from the old HYDROSORB and bungee suspension/shock absorber unit(s) 100. If installed, remove approved F. Atlee Dodge Main Landing Gear Safety Cables (not shown) from the upper end at the "V" cabane using appropriate sized wrenches. Remove the HYDROSORB/bungee unit 100 from the "V" cabane and the upper end of the lower shock strut 101.

Inspect the "V" cabane 102 and lower shock strut assemblies 101 for continued airworthiness condition. Reuse or replace as necessary.

Referring now to FIG. 2, install the new replacement BAR-18 suspension/shock absorbing unit 1 in place of the original hydrosorb unit. These units are a direct replacement for the old unit and can be installed in only one way. There is no right or left-hand unit; they work on either side of the landing gear struts. The unit is installed by attaching the attachment fitting 10 to the "V" cabane 102 and the dynamic suspension rod 30 to the lower shock strut 101. These components are bolted to the V cabane 102 and lower struts using common fasteners suitable for the purpose. Finally, if previously installed, reinstall the main landing gear safety cables removed in step no. 2.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. An airplane landing gear suspension and shock absorbing device comprising:
   a) an outer housing, having a closed end and an open end;
   b) a first attachment means, fixedly attached to said closed end of said outer housing;
   c) a piston, having a proximate end and a distal end, operably installed with said outer housing;
   d) a means for dampening the movement of said piston, operably installed in said outer housing and being in operable communication with said piston, and further, wherein said means for dampening the movement of said piston forms a single, solid, contiguous resilient member of deformable material;
   e) a means for holding the piston and means for dampening the movement of said piston within said outer housing removably attached to the open end of said outer housing; and
   f) a second attachment means, attached to said distal end of said piston.

2. The airplane landing gear suspension and shock-absorbing device of claim 1 wherein the piston comprises:
   a) a dynamic suspension rod, having a proximate end and a distal end;
   b) a retainer, attached to said proximate end of said dynamic suspension rod; and
   c) a means for securing said retainer to said proximate end of said dynamic suspension rod.

3. The airplane landing gear suspension and shock-absorbing device of claim 2 wherein the second attachment means comprises an attachment hole formed in the distal end of said dynamic suspension rod.

4. The airplane landing gear suspension and shock-absorbing device of claim 1 wherein the means for dampening the movement of said piston comprises a polyurethane member having a hollow center.

5. The airplane landing gear suspension and shock-absorbing device of claim 1 wherein the means for dampening the movement of said piston comprises a plurality of polyurethane disks, assembled into a single, contiguous, cylinder structure.

6. The airplane landing gear suspension and shock-absorbing device of claim 1 wherein the means for holding the piston and means for dampening the movement of said piston within said outer housing removably attached to the open end of said outer housing comprises:
   a) a retainer member; and
   b) a means for securing the retainer member within the open end of said outer housing.

7. The airplane landing gear suspension and shock-absorbing device of claim 6 wherein the means for securing the retainer member within the open end of said outer housing comprise:
   a) a plurality of bolts operably engaging said retainer member and said outer housing; and
   b) a length of safety wire, secured to each of said plurality of bolts.

8. An airplane landing gear suspension and shock-absorbing device comprising:
   a) an outer housing, said outer housing being generally cylindrical and having a closed end and an open end;

b) an attachment fitting, fixedly attached to said closed end of said outer housing;

c) a dynamic suspension rod, having a proximate end and a distal end, the distal end of said dynamic suspension rod having a mounting hole formed therein;

d) a retainer, placed on said proximate end of said dynamic suspension rod;

e) a retainer bolt, installed within the dynamic suspension rod to hold said retainer on said dynamic suspension rod;

f) a dampening member, installed on said dynamic suspension rod, wherein said dampening member comprises a solid, resilient, member of deformable material; and g) an end retainer, attached to the open end of said outer housing to hold said dampening member within said outer housing.

9. The airplane landing gear suspension and shock-absorbing device of claim 8 wherein the dampening member comprises a polyurethane member, having a hollow center.

10. The airplane landing gear suspension and shock-absorbing device of claim 9 wherein the polyurethane member comprises a plurality of polyurethane disks, assembled into a cylinder structure.

11. The airplane landing gear suspension and shock-absorbing device of claim 9 wherein the polyurethane member comprises a cylinder.

12. An airplane landing gear suspension and shock-absorbing device comprising:

a) an outer housing, having a tubular member having a length, a first end and a second end, and further wherein said second end has a perimeter and further wherein a plurality of holes are formed about the perimeter of said second end;

b) an end wall, being fixedly attached to the first end of said tubular member, thereby sealing the first end of said tubular member;

c) an attachment fitting, fixedly attached to said first end of said tubular member;

d) a dynamic suspension rod, having a proximate end and a distal end and a length, whereby the length of said dynamic suspension rod is greater than the length of said tubular member, the proximate end of said dynamic suspension rod having a threaded portion formed therein, the distal end of said dynamic suspension rod having a mounting hole formed therein;

e) an end retainer, placed on said proximate end of said dynamic suspension rod;

f) a retainer washer, abutting said end retainer;

g) a retainer bolt, installed within the threaded portion of the dynamic suspension rod such that said end retainer and said retainer washer are secured on said proximate end of said dynamic suspension rod;

h) a dampening member, having a length greater than the length of said tubular member, and being installed on said dynamic suspension rod, and abutting the end retainer, wherein said dampening member comprises a solid, resilient, member of deformable material;

i) a second retainer, having a plurality of threaded holes, positioned within the second end of said tubular member such that the plurality of holes in said second retainer align with the plurality of holes in said tubular member; and j) a plurality of bolts each of said plurality of bolts passing through one of said plurality of holes in said second end of said tubular member and engaging in one of said plurality of threaded holes in said second retainer, to hold said second retainer in a fixed position in said second end of said tubular member.

13. The airplane landing gear suspension and shock-absorbing device of claim 12 wherein the dampening member is in a stat of compression within said tubular member when said second retainer is in said fixed position in said second end of said tubular member.

14. The airplane landing gear suspension and shock-absorbing device of claim 12 wherein said second retainer has a center hole formed therein, and further wherein said dynamic suspension rod passes through said center hole such that the distal end of said dynamic suspension rod extends outside of said tubular member.

15. The airplane landing gear suspension and shock-absorbing device of claim 12 further comprising: a length of safety wire, secured to each of said plurality of bolts on said second end of said tubular member.

16. The airplane landing gear suspension and shock-absorbing device of claim 12 further comprising a means for securing said retainer bolt within said dynamic suspension rod.

17. The airplane landing gear suspension and shock-absorbing device of claim 16 wherein the means for securing said retainer bolt within said dynamic suspension rod comprises a pin, secured within said dynamic suspension rod and said retainer bolt.

18. The airplane landing gear suspension and shock-absorbing device of claim 12 wherein the dampening member comprises a plurality of polyurethane disks, assembled into a cylinder structure.

19. The airplane landing gear suspension and shock-absorbing device of claim 12 wherein dampening member comprises a cylinder.

* * * * *